Sept. 5, 1967 G. WEISS 3,340,157
DISTILLAND TREATING AND CONDENSING APPARATUS
Filed Nov. 22, 1963
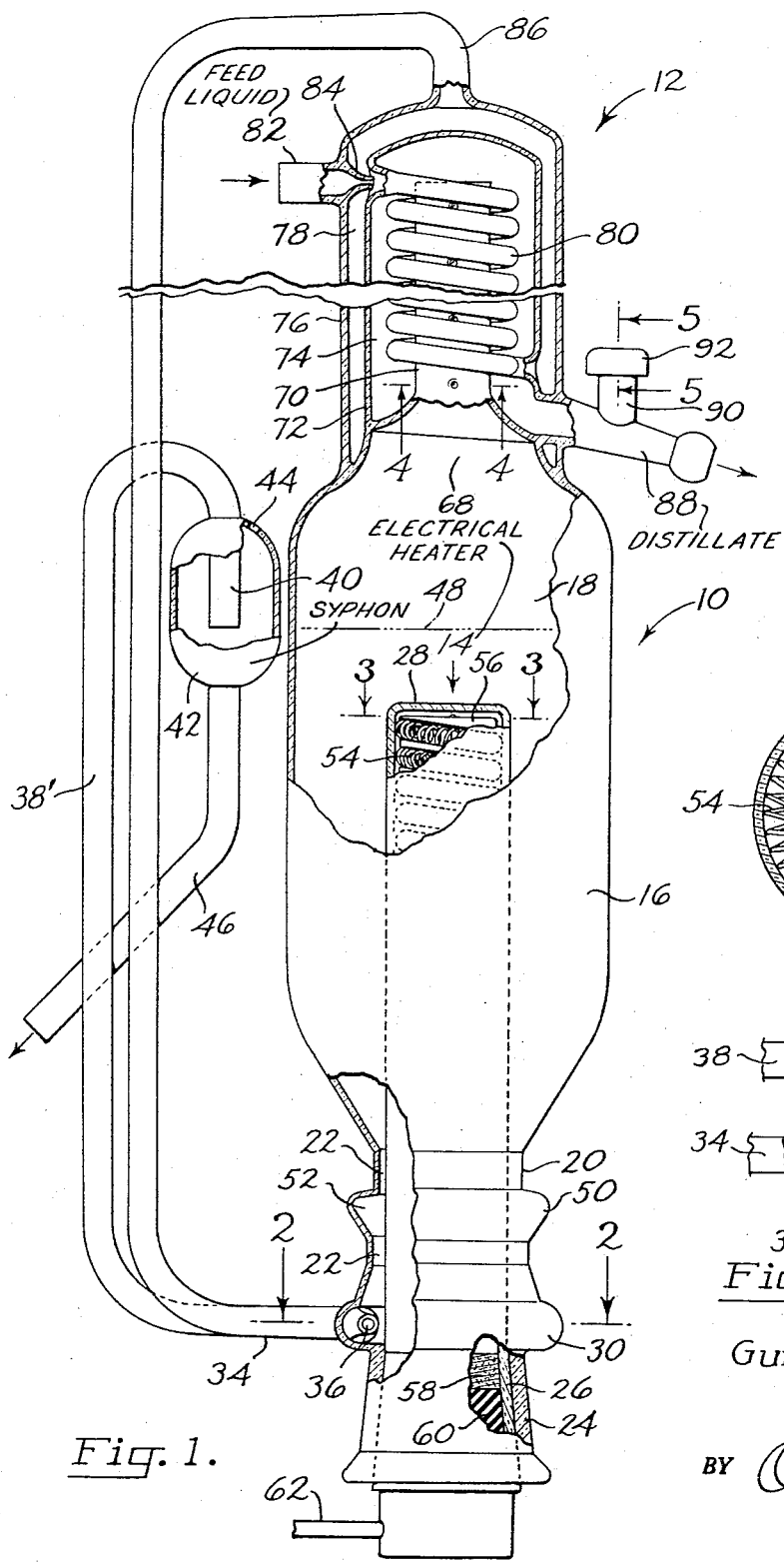
Fig. 1.
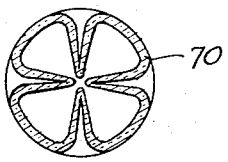
Fig. 5.
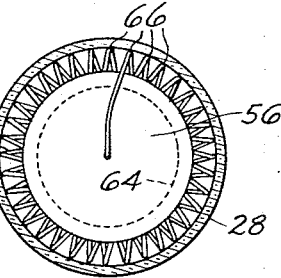
Fig. 4.
Fig. 3.
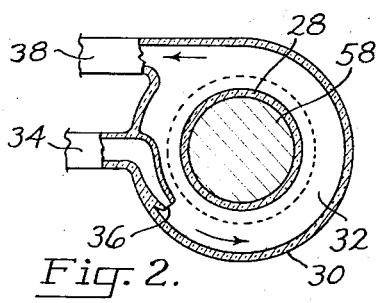
Fig. 2.
Gunther Weiss
INVENTOR.
BY Oliver D. Olson
Agent

United States Patent Office 3,340,157
Patented Sept. 5, 1967

3,340,157
DISTILLAND TREATING AND CONDENSING APPARATUS
Gunther Weiss, Beaverton, Oreg., assignor to Electro Glass Laboratories, Inc., Beaverton, Oreg., a corporation of Oregon
Filed Nov. 22, 1963, Ser. No. 325,642
6 Claims. (Cl. 202—180)

This invention relates to apparatus for distilling liquids, and more particularly to automatic distillation apparatus for the continuous production of water of the highest purity.

Apparatus provided heretofore for the continuous distillation of liquids such as water, have been characterized by being rather bulky assemblies of a plurality of separate components which require separate supports and utilize an excessive amount of space. The distilling and condensing components of these prior devices also have not been completely satisfactory from the standpoint of efficiency, as reflected by the degree of impurity of the distillate and the relatively large ratio of total volume of water used to volume of distillate output. Further, the devices of the prior art have not been completely satisfactory in their ability to remove solids from the liquid being distilled, thus requiring frequent disassembly and cleaning of the apparatus.

It is the principal object of the present invention to provide liquid distillation apparatus in the form of a unitary, self-contained, compact assembly of minimum size.

Another important object of this invention is the provision of liquid distillation apparatus in which the frequency of cleaning is reduced to a minimum.

Still another important object of the present invention is to provide, for liquid distillation apparatus, a condenser of high efficiency and yet is of unitary construction of minimum size.

Another important object of this invention is to provide inlet means for a container in which a liquid is to be continuously admitted and heated to its boiling point, which inlet means functions automatically to separate solids from the liquid being admitted to the container.

A further important object of this invention is the provision, for a container in which a liquid is continuously admitted for heating to its boiling point, of novel inlet means which functions to minimize the mixing of cold liquid with the heated liquid in the container.

Another important object of the present invention is the provision of liquid distillation apparatus in which the liquid to be distilled also may be employed as the coolant for the condensing component.

A further important object of this invention is the provision of liquid distillation apparatus which includes simplified means for the automatic maintenance of liquid level in the distilling component.

A further important object of the present invention is to provide a novel electrical heater for use in heating liquids to the boiling point.

A still further important object of the present invention is the provision of liquid distillation apparatus which is of simplified construction for economical manufacture.

The foregoing and other objects and advantages of this invention will appear from the following detailed description, taken in connection with the accompanying drawing in which:

FIG. 1 is a foreshortened view in front elevation of liquid distillation apparatus embodying the features of the present invention, parts thereof being broken away to disclose details of internal construction;

FIG. 2 is a fragmentary sectional view taken along the line 2—2 in FIG. 1 and showing details of construction of means for effecting the automatic separation of solids from the liquid to be heated to the boiling point;

FIG. 3 is a sectional view taken along the line 3—3 in FIG. 1 and showing the construction of an electric heater embodying features of this invention;

FIG. 4 is a sectional view taken along the line 4—4 in FIG. 1; and

FIG. 5 is a fragmentary sectional view taken along the line 5—5 in FIG. 1 and showing the construction of a shielded vapor escape in the distillate outlet of the condensing component.

In the preferred embodiment illustrated in the drawing, the distilling component 10 and condensing component 12 are constructed entirely of glass as a unitary assembly, with the heater component 14 being detachable therefrom.

The distilling component comprises an elongated hollow housing 16 defining a distilling chamber 18 therein. The bottom end of the distilling housing chamber communicates with a hollow downward extension 20 of reduced diameter which forms an inlet chamber 22. The terminal end of the extension is formed as a tapered ground glass joint 24 for releasably securing therein the ground glass joint 26 formed at the lower end of the elongated quartz glass envelope 28. This envelope extends upwardly through the inlet chamber into the distilling chamber, and its joint 26 forms a closure for the lower end of the inlet chamber.

In the preferred embodiment illustrated, means is provided for continuously and automatically removing solids from the liquid to be admitted to the chamber 18. To this end, a lower portion 30 of the extension 20 defining the inlet chamber 22 is enlarged in diameter to form an annular centrifuge chamber 32 (FIG. 2) the inner periphery of which communicates with the inlet chamber 22. A liquid inlet tube 34 extends into this centrifuge chamber and terminates in a nozzle 36 which is directed substantially tangential to the inner wall of the centrifuge chamber. An outlet tube 38 also communicates with this centrifuge chamber, substantially tangential thereto and in a direction facing the direction of rotation of liquid around the chamber from the inlet nozzle, as indicated by the arrows. Thus, as the liquid to be admitted to chamber 18 is forced under pressure through the inlet nozzle, it circulates around the centrifuge chamber and, by said centrifugal action, forces solid particles entrained therein radially outward to the wall 30 of the centrifuge chamber. The solid particles thus are carried out through the outlet tube 38 with the surplus liquid, i.e. the delivered liquid which is in excess of that needed to fill the chamber 18 to a predetermined level.

Automatic level control means is provided for maintaining a desired level of liquid in the chamber 18 continuously as the liquid is vaporized. In the embodiment illustrated, this means is provided by a glass tube extension 38' of the outlet tube 38. This extension projects upwardly adjacent the distilling housing 16 and terminates in a downwardly bent end section 40 which is contained within a glass bowl 42 secured thereto. An opening 44 adjacent the top of the bowl communicates the interior of the latter with the atmosphere. A glass drain tube 46 extends from the bottom end of the bowl, in communication with the interior thereof.

The terminal end of the tube section 40 within the bowl is positioned at a height intermediate the top and bottom ends of the distilling chamber 18 at which it is desired to maintian the level 48 of liquid. Thus, liquid forced into the distilling chamber will rise to that level, after which any additional liquid will flow out through the drain tube 46.

Moreover, if the liquid supply to the distilling chamber is shut off, the syphon break provided by the end of the tube section 40 within the bowl 42 prevents the liquid from draining from the distilling chamber.

Means also is provided to minimize the mixing of cold liquid from the inlet chamber 22 with hot liquid in the chamber 18. It is by minimizing this mixing that maximum efficiency of heating in the chamber 18 is achieved. To this end, an intermediate portion 50 of the extension 20 is enlarged in diameter to form an annular reservoir 52 interposed between vertical sections of the inlet chamber 22. This enlarged reservoir serves to receive the liquid which flows spirally upward from the centrifuge chamber 32. It is in this reservoir 52 that the spiral motion of the liquid is dampened, whereupon the liquid then progresses upward through the upper section of the inlet chamber 22 and enters the chamber 18 in a much slower spiral motion.

Slight spiral motion of the liquid in the lower tapered portion of the chamber 18 is desirable, for it tends to wash said tapered portion continuously and thus minimizes the deposit thereon of any solids which might settle out from the liquid in the chamber 18. For example, it has been found in the continuous distillation of water that this tapered bottom portion of the distilling chamber is maintained substantially free of calcium and other salts, representing hardness factors, which continuously precipitate down from the water during boiling. These solids gravitate downward to the centrifuge chamber from whence they are exhausted to the drain.

An elongated electrical heater, comprising the heating element 54 wound helically on the elongated electrically non-conductive coil 56, is received removably within the envelope 28. The heater is retained in the envelope by means of the plug 58 of the glass fiber, or other suitable heat insulation material, and the rubber stopper 60 secured frictionally within the joint 26 of the envelope 28. The electrical conductors for the heating element are confined within a cord 62 which extends outwardly through the stopper, as illustrated.

In the preferred embodiment best illustrated in FIG. 3 the heating element 54 is an elongated coil of helically wound resistance wire wrapped helically about the core 56 and retained in a helical groove 64 formed in the latter. The spaced loops of the coil of wire make a multiplicity of point contacts, as at 66, with the inner surface of the quartz envelope 28 along the length and circumference of the latter. Thus, when the resistance wire is heated it produces a multiplicity of tiny, spaced hot spots on the envelope. These hot spots constitute tiny thermal generators which produce a multiplicity of tiny bubbles of vapor over the surface of the envelope. It is by this production of tiny bubbles of vapor that most efficient heating of the liquid is achieved, while simultaneously minimizing the incidence of "bumping." This latter effect is caused by the development of large bubbles of vapor in the liquid, and the violence of its action may result in the expulsion of the liquid phase from the chamber 18. Indeed, the violence of the action may become so severe as to cause breakage of the glass apparatus.

The coil of wire 54 may be replaced by a tubular heating element wrapped helically about the core 56 or otherwise supported in contact with the inner surface of the envelope 28. In this case, substantially line contact is made between the heating element and envelope, providing a multiplicity of longitudinally spaced hot spots (separated by cooler areas between adjacent loops of the helix). Accordingly, reference in the appended claims to a multiplicity of point contacts between the heating element and envelope is intended to define either or both of the above described arrangements.

An opening 68 is provided at the top of the distilling housing 16 for communication with the condensing component 12 of the apparatus. In the embodiment illustrated, this component includes an elongated glass tube 70 which is open at both ends and, as best illustrated in FIG. 4, preferably is interrupted internally, as in the manner of conventional Vigreux column or other suitable configuration, to provide maximum contact area and to break any bubbles which might tend to percolate upwardly from the distilling chamber 18. The tube 70 is joined at its flared bottom end to the lower end of the condenser housing wall 72. This wall is spaced outwardly from the tube 70 and is closed at its top end a spaced distance above the upper open end of the tube. The wall thus defines a condensing chamber 74. A second wall 76 is joined at its bottom end to the bottom end of the condenser housing wall 72 and projects upwardly in spaced relation to the latter to provide a space 78 therebetween for the circulation of a liquid coolant.

The bottom end of the outer wall 76 is joined to the open end of the distilling housing 16. Although this integral arrangement of the distilling and condensing components is preferred, they may be provided as separate components arranged for detachable connection. This may be achieved, for example, by the provision of ground glass joints between the upper end of the distilling housing 16 and the lower end of the outer wall 76, as will be apparent.

An elongated helical coil of glass tube 80 encircles the tube 70 and its bottom end is joined to the condenser wall 72 and communicates therethrough with the space 78 between the walls. The flared upper end of the tubing 80 is joined to the wall 72 and communicates therethrough with the space 78. An inlet tube 82 is joined to the outer wall 76 and terminates inwardly thereof in a nozzle 84 which is received freely within the flared upper end of the tubing 80. This free coupling between the inlet tube 82 and the coil tubing 80 affords efficient introduction of cooling liquid into the tubing 80 and yet permits relative movement between the walls 72 and 76 due to differential expansion and contraction resulting from their exposure to different temperatures.

A glass outlet tube 86 is joined to the outer wall 76 and communicates therethrough with the space 78 for carrying the cooling liquid therefrom.

A distillate outlet tube 88 of glass extends through the double walls 72, 76 of the condensing unit adjacent the bottom thereof, and communicates at its inner end with the condensing chamber 74. This outlet tube serves to remove the purified distillate from the condensing chamber, and it forms a lateral extension of the bottom of the chamber which is defined by the flared bottom end of the tube 70. As illustrated in FIG. 1, this flared bottom end preferably slopes toward the outlet tube 88, to insure complete removal of distillate from the chamber 74.

Intermediate its ends the outlet tube 88 preferably communicates with a vapor outlet tube 90 which is provided with a cap 92 to prevent the entrance of foreign matter. In the preferred embodiment illustrated in FIG. 5, the vapor tube is made of glass and its outer end is serrated or scalloped. The cap 92 rests upon the projections of these serrations, providing a plurality of openings immediately under the cap for the escape of vapor. The cap may be secured to the upper ends of the serrations, or it may rest freely thereon, as desired.

It is to be noted that the condensing component 12 is quite compact and yet provides an extremely large cooling area by the combined surfaces of the inner side of the wall 72, the spiral tube 80 and the internally interrupted tube 70. This arrangement contributes materially to the production of a distillate of high purity.

The coolant outlet tube 86 may extend to a drain, if the coolant is an expendable liquid such as water. Alternatively, it may extend to the return side of a compressor-pump unit (not shown) whose outlet is connected to the inlet tube 82, in the event the coolant is non-expendable.

On the other hand, the apparatus is illustrated in the drawing for use in the distillation of water. Accordingly, the water coolant employed in the condensing unit 12 is conveyed to the distilling chamber 18, after preheating in the condensing unit. To this end the outlet tube 86 is extended downward and joined at its bottom end to the inlet tube 34 for communication with the inlet chamber 22. Thus, preheated water from the condensing unit is utilized as the supply of water for the distilling chamber 18.

In the event the liquid to be distilled is not water or other liquid also used as the coolant, the coolant outlet tube 86 is not connected to the inlet tube 34, but rather may be directed to a drain or other return, as previously explained. The inlet tube 34 is connected to a source of liquid to be distilled, in which case the drain tube 46 is connected to the return side of a feed pump (not shown).

Cleaning of the apparatus may be effected simply by forcing an acid or other suitable cleaning solution through the coolant inlet 82, tube 70, passageway 78, outlet tube 86, inlet tube 34, nozzle 36 and thence around the centrifuge chamber 32 and upwardly through the inlet chamber 22, distilling chamber 18, condensing chamber 74 and out the distillate outlet 88. It will be understood, of course, that the drain tube 46 and opening 44 in the bowl 42 will have to be plugged for this purpose. Alternatively, the cleaning solution may be drawn through the apparatus by applying a vacuum through the distillate outlet 88, in which case the vapor escape tube 90 also will have to be plugged. In either case the apparatus subsequently is flushed thoroughly with water or other suitable rinsing liquid.

From the foregoing it will be apparent that the present invention provides liquid distillation apparatus which is of compact, unitary construction utilizing a minimum of space. It is versatile in use, is highly efficient in operation, is capable of being cleaned with speed and facility without disassembly, or is capable of continuous and automatic operation with a minimum of maintenance.

It will be apparent to those skilled in the art that various changes may be made in the details of construction described hereinbefore without departing from the spirit of this invention and the scope of the appended claims.

Having now described my invention and the manner in which it may be used, what I claim as new and desire to secure by Letters Patent is:

1. Liquid distillation apparatus comprising:
   (a) a distilling chamber,
   (b) a condensing chamber having an inlet above and communicating with the distilling chamber, and a distillate outlet below said inlet, and
   (c) liquid inlet means communicating with the bottom end of the distilling chamber and including an annular centrifuge chamber having a restricted open upper end communicating with the distilling chamber and having a liquid inlet and a surplus liquid outlet spaced apart circumferentially and both the liquid inlet and the liquid outlet being disposed substantially in a common plane and both being tangential to the periphery of said centrifuge chamber for the circulation therethrough of liquid under pressure, the inlet facing the direction of circulation and the outlet facing opposite the direction of circulation, whereby to remove solid particles from the liquid through said surplus liquid outlet by centrifugal action.

2. The apparatus of claim 1 wherein the inlet means includes an inlet chamber communicating the annular centrifuge chamber with the distilling chamber, and an enlarged annular reservoir is positioned intermediate the ends of the inlet chamber for dampening the spiral motion of liquid entering the distilling chamber.

3. The apparatus of claim 1 including passageway means in heat conductive relationship with the condensing chamber and having an inlet and an outlet for the passage of a coolant therethrough, and conduit means interconnecting the outlet of the passageway means and the liquid inlet means, whereby to utilize as the coolant the same liquid which is to be distilled.

4. Liquid distillation apparatus comprising
   (a) a distilling chamber,
   (b) a condensing tube communicating at one end with the upper end of the distilling chamber and extending outwardly therefrom, the outer end of the tube being open,
   (c) a hollow condensing chamber enclosing the condensing tube with the outer end of the latter communicating with said condensing chamber, the condensing chamber having spaced outer and inner walls providing a space therebetween for the circulation of liquid coolant therethrough,
   (d) a coil for passing said liquid coolant in said condensing chamber which coil encircles said condensing tube and communicates at each end with said space, said coil having a flared-end opening and means comprising a nozzle which extends through the outer wall of said space and terminates adjacent said flared-end opening for the introduction of said liquid coolant into said coil,
   (e) distillate outlet means extending outwardly through said condensing chamber walls and communicating at its inner end with said condensing chamber, and
   (f) liquid inlet means communicating with the bottom end of the distilling chamber.

5. The apparatus of claim 4 including conduit means interconnecting the space between said outer and inner walls and the liquid inlet means, whereby to utilize as the coolant the same liquid which is to be distilled.

6. Liquid distillation apparatus comprising
   (a) a distilling chamber,
   (b) electric heater means in the distilling chamber and comprising an envelope of heat conductive material, and electrical resistance means in the envelope and having a plurality of spaced points in contact with the envelope,
   (c) a condensing tube communicating at one end with the upper end of the distilling chamber and extending outwardly therefrom, the outer end of the tube being open,
   (d) a hollow condensing chamber enclosing the condensing tube with the outer end of the latter communicating with said condensing chamber, the condensing chamber having spaced walls providing a space therebetween for the circulation of a coolant therethrough,
   (e) a hollow coolant conduit in the condensing chamber encircling the condensing tube and communicating at one end with the space between the condensing chamber walls and extending at its opposite end outwardly through said walls for connection to a supply of coolant,
   (f) distillate outlet means extending outwardly through said condensing chamber walls and communicating at its inner end with said condensing chamber,
   (g) liquid inlet means communicating with the bottom end of the distilling chamber and including an inlet chamber having an enlarged annular reservoir intermediate its ends, and an annular centrifuge chamber below the inlet chamber and communicating at its inner periphery with said inlet chamber and having circumferentially spaced inlet and outlet means disposed substantially tangential to the outer periphery of the centrifuge chamber for the circulation therethrough of liquid under pressure, whereby to remove solid particles from the liquid by centrifugal action,
   (h) syphon break level control means communicating with the outlet means of the annular centrifuge chamber and positioned at a predetermined level intermediate the ends of the distilling chamber for maintaining liquid in the latter at said predetermined level, and
   (i) conduit means interconnecting the space between the condensing chamber walls and the inlet of the annular centrifuge chamber, whereby to utilize as the coolant the same liquid which is to be distilled.

References Cited

UNITED STATES PATENTS

| | | | |
|---|---|---|---|
| 1,635,112 | 7/1927 | Carlson et al. | 203—10 X |
| 2,468,872 | 5/1949 | Goldsbarry et al. | 202—185 |
| 2,490,659 | 12/1949 | Snyder | 202—234 X |
| 2,642,386 | 6/1953 | Piros | 203—88 |
| 2,837,469 | 6/1958 | Mohn | 203—92 X |
| 2,843,534 | 7/1958 | Harper | 203—88 |
| 2,994,647 | 8/1961 | Williamson et al. | 203—11 X |
| 3,080,300 | 3/1963 | Smith | 203—88 |
| 3,163,587 | 12/1964 | Champe | 202—176 |

NORMAN YUDKOFF, *Primary Examiner.*

F. E. DRUMMOND, *Assistant Examiner.*